United States Patent [19]

Sippel

[11] 3,987,465

[45] Oct. 19, 1976

[54] AUTOMATIC CAMERA/PROCESSOR SYSTEM WITH FILM TURNOVER

[75] Inventor: Charles P. Sippel, Villa Park, Ill.

[73] Assignee: Log Etronics Inc., Springfield, Va.

[22] Filed: Sept. 9, 1974

[21] Appl. No.: 504,645

[52] U.S. Cl. .................................. 354/83; 355/27; 271/65
[51] Int. Cl.[2] ........................................ G03B 17/50
[58] Field of Search ................. 354/76, 83; 355/27, 355/13, 56; 271/65, 66, 184, 185, 186

[56] References Cited
UNITED STATES PATENTS

| | | | |
|---|---|---|---|
| 3,335,636 | 8/1967 | Atkinson | 355/56 X |
| 3,416,791 | 12/1968 | Beckman | 271/65 |
| 3,468,605 | 9/1969 | Martin | 355/13 X |
| 3,532,423 | 10/1970 | Bruning | 355/27 |

*Primary Examiner*—Monroe H. Hayes
*Attorney, Agent, or Firm*—Pollock, VandeSande & Priddy

[57] ABSTRACT

A Graphic Arts camera/processor system includes a darkroom enclosure, accessible to an operator for the performance of various tasks therein, having a camera mounted in one wall thereof for cooperation with a copyboard and light sources external to the enclosure. An automatic film processor is mounted in an opposite wall of the enclosure with its input rollers being disposed within the enclosure, and a conveyor system extends upwardly from the film plane of the camera within the enclosure, across the top of the enclosure, and thereafter downwardly to the input rollers of the processor, to feed a sheet of image-bearing film, cut from a length of roll-supplied film by a knife arrangement associated with the conveyor, from the camera to the film processor automatically. The conveyor system includes a selectively operable sheet turnover mechanism for assuring that, when the film is exposed at the camera through the film base, the sheet of image-bearing material is thereafter fed to the processor with its emulsion side facing upward.

9 Claims, 2 Drawing Figures

AUTOMATIC CAMERA/PROCESSOR SYSTEM WITH FILM TURNOVER

BACKGROUND OF THE INVENTION

Various Graphic Arts camera systems are known wherein copy, such as a newspaper page paste-up, is photographed, and the resultant exposed sheet photosenstive material is then appropriately processed to produce an image-bearing sheet which is used in the preparation of printing plates. Efforts have been made to mechanize or automatize such systems to reduce the need for supervisory personnel by, for example, causing the sheet of image-bearing material to be fed directly from the camera into an automatic film processor, as is shown, for example, in Atkinson U.S. Pat. No. 3,335,636. Such arrangements tend to become mechanically complex, however, and may dedicate the processor to the associated camera making it unavailable for other film processing applications whereby, as a result, the overall system is comparatively expensive and wasteful of space.

The present invention, recognizing these problems of prior art approaches, is concerned with an automatic camera/processor system wherein an exposed sheet of film is fed, by means of conveyors disposed inside a darkroom enclosure, directly into the input rollers of an automatic film processor which projects into said darkroom enclosure, the darkroom enclosure being sufficiently large to receive an operator who thereby can gain access to the input feed tray of the processor when it is desired to use the processor for the processing of other image-bearing sheets of material exposed, for example, in a completely different camera system. By this arrangement, the overall system achieves far greater versatility than has been possible heretofore. The film processor is, as desired, part of an automatic film exposure and processing system; the operator can, if necessary, transfer exposed sheets of film from the camera to the processor manually if any difficulty or jam should be encountered in the conveyor system; and the processor is available to the operator for use in processing sheets of film exposed at other locations.

In an arrangement of the general type described, it is sometimes desirable to expose a sheet of film through its base, i.e., with the emulsion side of the film facing away from the copyboard. When a sheet of film so exposed is then fed by the conveyor system into the film processor, the emulsion side will be facing downward at the input rollers of the processor. However certain processors require that film sheets to be processed be fed into the processor with the emulsion side facing upward, and this further requirement necessitates that the exposed film sheet be turned over subsequent to its exposure and prior to delivery to the film processor. While such a turnover could be effected manually, this would militate against the desired automaticity of the overall system. The present invention, recognizing this further problem which may be encountered under the specified circumstances, i.e., exposure through the base of the film in conjunction with the use of a film processor which requires the film to be fed emulsion side up, therefore incorporates a film turnover mechanism which forms a portion of the automatic transport system and which assures that all film can be exposed as desired and also delivered to the film processor as may be necessary under the existing circumstances.

Various sheet turnover mechanisms have been suggested heretofore. Such mechanisms are described, for example, in British Pat. No. 784,790 and in U.S. Pat. Nos. 1,337,031, 1,813,476, 2,901,246, 3,416,791, 3,646,325, and 3,742,847. These prior inverters have not been employed to invert an emulsion-bearing sheet of sensitized film material and, in general, are unsuitable for such applications since the types of mechanism employed might tend to scratch a sheet of film. Moreover, such prior art inverters are normally adapted to handle a sheet of predetermined maximum length whereas, in the system of the present invention, the actual length of sheet to be inverted may be variable or indeterminate, thereby again making the prior art mechansims unsuitable for use in the present invention.

The present invention obviates these problems of the prior art in an automatic camera/processor system of the general type described previously, by incorporating a film turnover mechanism which is adapted to receive and invert sheets of sensitized material without cosmetically marking such sheets and without being length-dependent.

SUMMARY OF THE INVENTION

In accordance with the present invention, an automatic camera/processor system comprises a Graphic Arts camera having a hingedly mounted vacuum back disposed in one wall of a darkroom enclosure and accessible to an operator who enters that enclosure, an automatic film processor the input side of which is intergrated with an opposing wall of the darkroom; and an intervening conveyor mechanism, all located in the darkroom at positions which do not inhibit an operator's work within the enclosure, for transferring an exposed sheet of film automatically from the camera to the film processor. The conveyor system includes a selectively operable sheet turnover mechanism which can be adjusted, by the operator, to either of two operating conditions in dependence upon the orientation of the film relative to the camera lens, thereby to permit an exposed sheet of film to be fed along a first path when the film orientation is such that an exposed sheet of film would normally be fed by the conveyor into the processor with its emulsion side up, and to cause the exposed sheet of film to be turned over subsequent to its exposure and prior to being fed into the processor under those circumstances where, in the absence of such turnover, the exposed sheet of film would be fed into the processor with its emulsion side down.

The turnover mechanism operates to cause a sheet of film to be diverted and driven into a secondary path transverse to the main conveying path and, at an appropriate time, to be redirected from said secondary path, after turnover, back into the main conveying path for delivery to the film processor. In order to render the operation of the turnover mechanism independent of sheet length, the sheet of film, when diverted into said secondary path, is caused to hang freely from the main conveying path within the darkroom enclosure, under the influence of gravity, and the turnover mechanism operates to sense passage of the trailing edge of the sheet past a predetermined point in said secondary path, thereby to cause a drive reversal operative to redirect the free-hanging sheet back into the main conveying path with its previously trailing edge now being the leading edge as the sheet is delivered to the processor. By this arrangement, and in particular by utilizing the initial trailing edge of the sheet to control the drive reversal, proper turnover becomes sheet-length independent.

BRIEF DESCRIPTION OF THE DRAWINGS

The foregoing objects, advantages, construction and operation of the present invention will become more readily apparent from the following description and accompanying drawings wherein.

DESCRIPTION OF THE PREFERRED EMBODIMENTS

Figure 1:
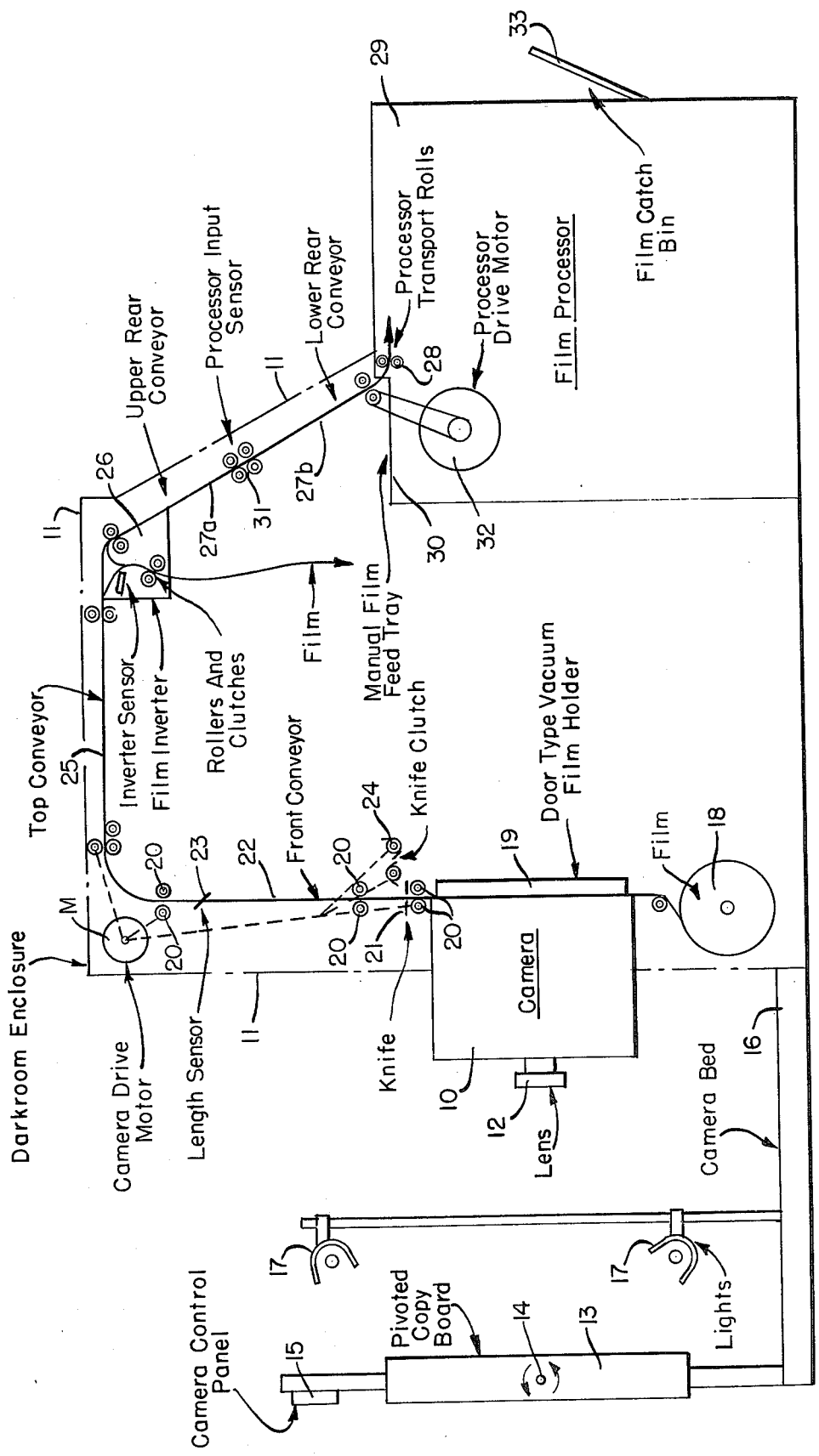
FIG. 1 is a diagrammatic representation of an automatic camera/processor system constructed in accordance with the present invention.

Referring initially to FIG. 1, the overall system of the present invention comprises a camera 10 which is mounted within one wall of a darkroom enclosure 11, shown for diagrammatic purposes in broken line. The camera is of conventional construction and, in one embodiment of the invention, may be of the fixed-focus type arranged to provide a unity magnification ratio. The lens 12 of the camera faces a copyboard 13 which is desirably mounted for movement about a pivot 14 to facilitate the placement of copy thereon, the copyholder being mounted for such pivotal movement within a suitable frame which carries a camera control panel 15 and which is fixedly mounted on a girder-type camera bed 16, extending from the darkroom enclosure 11, for mechanical rigidity. Also mounted on the camera bed 16 are appropriate lights 17 for illumination of the copy.

A suitably housed supply of film 18, in roll form, is disposed within darkroom enclosure 11 below camera 10 and feeds a length of film into the film plane of the camera where it is maintained in position by a vacuum film holder mounted within a hinged door-type camera back 19 of known form. Following the making of an exposure, the vacuum may be released to permit the length of film bearing the image thereon to be fed out of the camera while a new length of unexposed film is simultaneously fed into the camera for a new exposure. The sheet of film is punched, by a punching mechanism (not shown), at one or more locations outside the image area immediately following exposure and prior to its subsequent transport out of the camera to provide indicia permitting the image to later be accurately registered on a printing plate.

Following the aforementioned punching operation, and release of the holding vacuum, the length of image-bearing film is advanced by appropriate motor driven rollers 20, coupled to camera drive motor M, past a knife 21 along a front conveyor 22 until the leading edge of the film intercepts length sensor 23 (e.g., an appropriate microswitch). Actuation of sensor 23 operates to temporarily interrupt drive to rollers 20, and actuates a clutch 24 to cause knife 21 (which may, for example, be a rotary knife transportable across the width of the film) to sever the image-bearing portion of the film from roll film 18 as a discrete sheet. Completion of the knife cycle reinstates the transport operation to cause the severed sheet thereafter to pass, via further motor driven rollers (or through appropriate roller-belt arrangements which constitute the several conveyors), along a top conveyor 25 positioned adjacent the ceiling of the darkroom enclosure, thence past a film inverter or turnover mechansim 26 (to be described in further detail in reference to FIG. 2) onto a downwardly inclined rear conveyor, comprising an upper section 27a and a separate lower section 27b, and into input feed rollers 28 of an automatic film processor 29.

As shown in FIG. 1, film processor 29 is integrated with the wall of darkroom enclosure 11 opposite to the wall which incorporates camera 10. The input manual film feed tray 30 of the processor is disposed within the darkroom enclosure and is accessible to an operator to permit the operator to use the processor for other processing operations, as described earlier.

Since the camera transport speed may be different from (e.g., greater than) that of the film processor 29, the rear conveyor is separated into two sections. The upper section 27a of the rear conveyor is adapted to be driven at either the camera transport speed or the film processor transport speed, while the lower rear conveyor section 27b is driven at the film processor transport speed. As the cut sheet of film progresses through the upper rear conveyor section 27a, at the camera transport speed, its leading edge actuates a processor input sensor 31 (which may be another microswitch) which disengages the camera drive motor M from the upper rear conveyor section and which, by means of a suitable clutching mechanism, causes the upper and lower rear conveyor sections 27a, 27b to be driven by film processor drive motor 32 at the speed of the film processor transport. By this arrangement, therefore, a sheet of film may be rapidly transported out of and away from the camera 10 to permit initiation of a new exposure with minimum delay, and the previously exposed image-bearing sheet is nevertheless delivered to the processor 29 at the correct transport speed.

In known fashion, the exposed sheet of film is thereafter transported automatically through appropriate developing, fixing, washing, and drying stages within the processor, and is then delivered to a film catch bin 33 external of the darkroom enclosure for immediate utilization as desired, e.g., in the preparation of a printing plate.

As described earlier, it is sometimes desirable to feed film from roll 18 with its emulsion side facing away from camera lens 12, to permit the film to be exposed through the film base. As will be apparent from FIG. 1, in the absence of further considerations this would cause the exposed film sheet to be delivered to film processor 29 with its emulsion side facing downward. However, it is a requirement of certain film processors that sheets of film to be processed be fed thereto with the emulsion side facing up. When such conditions are encountered, it is necessary to turn the exposed sheet over subsequent to its exposure and prior to the processing operation. Such an inverting or film turnover operation is effected by the mechanism 26 which is disposed adjacent the ceiling of darkroom enclosure 11, at the junction between top conveyor 25 and upper rear conveyor 27a.

Figure 2:
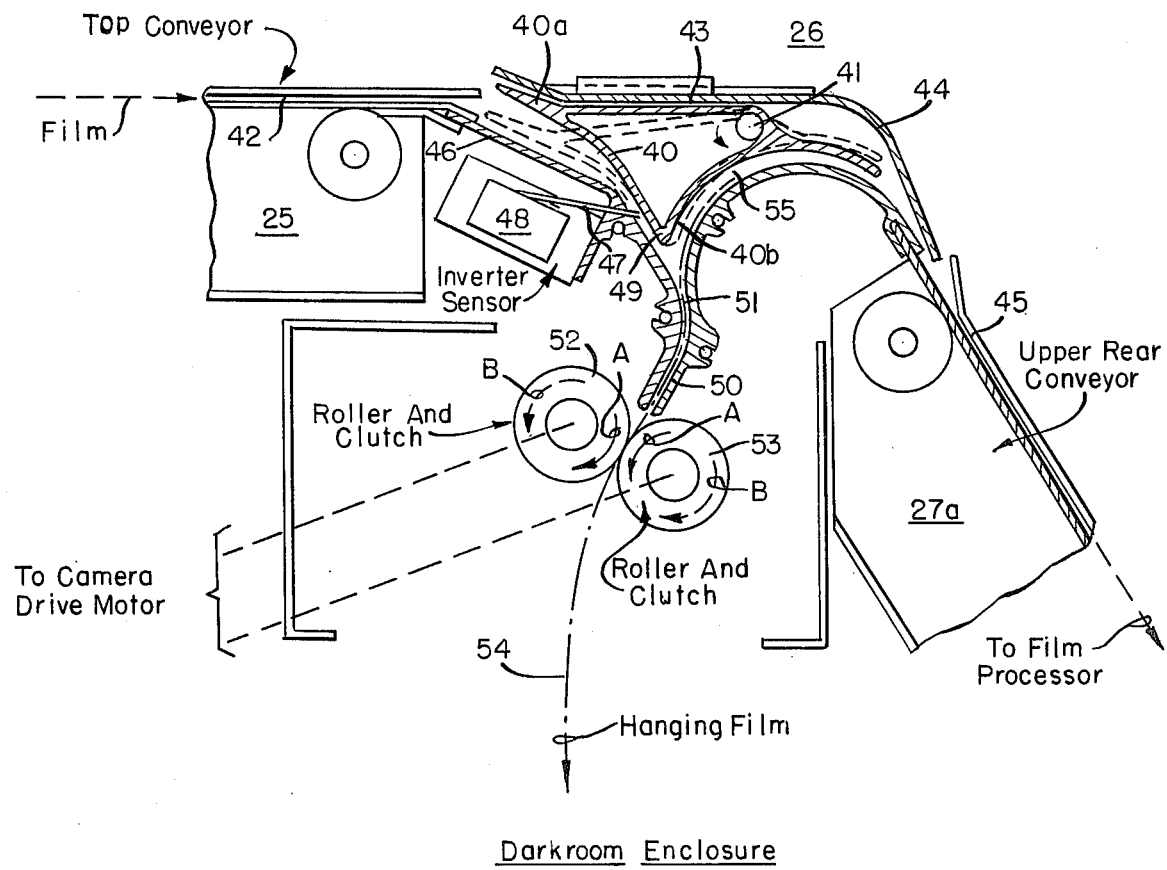
FIG. 2 is a detail view of the turnover mechanism employed in the present invention.

The details of inverter mechanism 26 are shown in FIG. 2. The mechanism comprises a diverter gate 40 which is mounted for pivotal movement at 41 and which can be shifted between the positions shown in full line and broken line in FIG. 2 by an operator within darkroom enclosure 11 (e.g., by manipulation of an appropriate handle) in dependence upon the orientation of the emulsion side of the film on roll 18 relative to the camera lens. When diverter gate 40 is in its broken line position, a sheet of film transported by top conveyor 25 through conveyor channel 42 is directed past the upper side of nose portion 40a of the diverter gate, across the top surface of said gate 40 through horizontal channel 43 formed between said top surface and a guide plate 44 spaced therefrom, and is then directed downwardly by plate 44 into conveyor channel 45 of upper rear conveyor 27a for transport toward and into film processor 29 in the manner described previously.

When it is desired to cause an inverting operation, diverter gate 40 is moved to its full line position to cause its nose portion 40a to extend across conveyor channel 42 in the manner illustrated. The leading edge of a sheet of film passing through channel 42 then engages the lower surface of nose 40a and is directed in a generally downward direction through a secondary path defined in part between the lower surface of nose 40a and a lower guide plate 46. As the sheet continues to be transported by the action of top conveyor 25, it deflects actuating arm 47 of inverter sensor 48 (which may be still another microswitch) and proceeds downwardly past the deflected arm 47 through a confining channel 49 defined between a portion of deflector plate 46 and the facing surface of diverter gate 40, and thence through a further confining channel 50 located between an extension of guide plate 46 and a facing arcuate guide plate 51, toward the nip of two rollers 52, 53.

Each of rollers 52, 53 is associated with a clutch the actuation of which is controlled by arm 47 of inverter sensor 48. One or the other of rollers 52, 53 is driven by the camera drive motor M when its associated clutch is engaged, and when its clutch is not engaged the roller in question is free turning, i.e., only one of the rollers 52, 53 is driven when sensor arm 47 has been deflected and the other roller is free turning at that time. Said other roller is in turn driven (in the opposite direction) when sensor arm 47 is released or undeflected.

For purposes of the subsequent discussion, let us assume that roller 52 is driven by the camera drive motor when arm 47 is deflected by film 54, and that the two rollers 52, 53 rotate, at this time, in the directions shown by full-line arrows A. Under these assumed circumstances, the leading edge of the sheet of film will pass downward through confining channels 49, 50 and through the nip of rollers 52, 53 and will then pass beyond those rollers to hang freely under the influence of gravity within the darkroom enclosure 11. The extent to which film sheet 54 hangs into the darkroom enclosure will, of course, be dependent upon the length of the sheet being transported. Arm 47 of inverter sensor 48 is, as illustrated, located immediately adjacent to and slightly above tail portion 40b of diverter gate 40. When the trailing edge of the sheet passes arm 47, the arm is released and this causes a reversal in the direction of rotation of rollers 52, 53. However, before reversal is effected, and due to inertia effects, the trailing edge of the film will have moved beyond tail portion 40b so that the resilience of the film material, taken together with the curvature of channel 50, causes the trailing edge to snap to the other side of said tail portion 40b and into the region of a channel 55 located between the curved under-surface of diverter gate 40 and the facing surface of guide plate 51.

Release of actuating arm 47 reverses the state of engagement of the clutches associated with rollers 52, 53. The camera drive motor M now drives roller 53 causing it to rotate in the oppste direction, with roller 52 now being free-turning, i.e., the two rollers now rotate in the directions shown by broken-line arrows B. This causes the hanging film 54 to be pulled in the reverse or upward direction back through confining channel 50 into and around curved channel 55 and into conveying channel 45 of the upper rear conveyor 27a. As a result of this sequence of operations, the previously trailing edge of the film becomes the leading edge of the film as it is directed into channel 45, and the film sheet is now fed as required with its emulsion side up into the film processor 29.

While I have thus described a preferred embodiment of the present invention, many variations will be apparent to those skilled in the art. It must therefore be understood that the foregoing description is intended to be illustrative only and not limitative of the present invention, and all such variations as are in accord with the principles described are meant to fall within the scope of the appended claims.

Having thus described my invention, I claim:

1. An apparatus for processing exposed photographic film sheet material of variable or indeterminate length comprising, in combination, a darkroom enclosure having a camera mounted in one wall thereof and a film processor mounted in another wall thereof, first conveyor means located within said enclosure between said camera and processor for conveying a length of said exposed photographic film sheet material along a predetermined first path, second conveyor means located within said enclosure between said camera and processor in spaced relation to said first conveyor means for conveying said length of exposed photographic film sheet material along a predetermined second path, a sheet turnover mechanism disposed between said first and second conveyor means at an elevated position within said enclosure, said mechanism being selectively operative to invert the sheet of material being conveyed from said first conveyor means to said second conveyor means independently of the length of said sheet, said mechanism including a diverter gate selectively movable to either of two predetermined positions, said diverter gate, when in one of said positions, defining a third path which is aligned at one of its ends with said first path and which is aligned at its other end with said second path whereby, when said diverter gate is in its said one position, said length of sheet material is conveyed from said first path through said mechanism along said third path directly to said second path, said diverter gate, when in the other of said positions, being operative to obstruct said third path and to define a fourth path leading from and transverse to said first path and a fifth path intersecting said fourth path and leading from said intersection to said second path, sensor means adjacent said fourth path for sensing the presence of sheet material at a predetermined portion of said fourth path adjacent to the intersection of said fourth and fifth paths, said sensor means comprising a device operative to sense the presence of said sheet of photographic film without creating an unwanted additional exposure on said exposed film, a pair of engaged rollers having their nip in alignment with said fourth path downstream of said sensor means and downstream of the intersection of said fourth and fifth paths, said darkroom enclosure providing an unobstructed space below said turnover mechanism and downstream of said engaged rollers the length of which space in the direction of travel of said sheet material along said fourth path is greater than the maximum expected length of said sheet, and drive means responsive to the sensing of sheet material by said sensor means for rotating said rollers in directions operative to draw said sheet material along said fourth path through the nip of said rollers past the intersection of said fourth and fifth paths and into said unobstructed space, said sheet of material in said fourth path hanging freely from said rollers into said space until the drive direction of said rollers is reversed, said drive means being responsive to the passage of the trailing edge of the sheet of material in said fourth path past said predetermined portion of said fourth path for reversing the direction of drive of said rollers at a time when said trailing edge has passed said intersection thereby to cause said sheet of material to be drawn out of said unobstructed space and driven by said rollers in the opposite direction along said fifth path to said second path with the trailing edge of the sheet in said fourth path being the leading edge when said sheet is driven along said fifth path.

2. The combination of claim 1 wherein said first and second conveyor means comprise portions of a conveyor mechanism extending upwardly from said camera along an interior wall of said enclosure to the ceiling of said enclosure, across said ceiling to the opposite wall of said enclosure, and then generally downwardly to the input rollers of the processor at a location adjacent the opposite interior wall of said enclosure.

3. The combination of claim 2 wherein said turnover mechanism is positioned adjacent the ceiling of said enclosure.

4. The combination of claim 2 including a supply of rollfilm for said camera, and knife means disposed adjacent said conveyor mechanism to sever a sheet of material from said supply subsequent to exposure by said camera, said sheet thereafter being conveyed along said conveyor mechanism to said processor.

5. The combination of claim 1 wherein said drive means is operative to drive only one of said pair of engaged rollers with the other roller being free turning when said sheet material is drawn along said fourth path, and said drive means is operative to drive the other of said pair of engaged rollers with said one roller being free turning when said sheet material is driven along said fifth path.

6. The combination of claim 1 wherein said sensor means comprises an electromechanical device having a movable element extending across at least a portion of said fourth path, said movable element being deflected to one side of said fourth path by the leading edge of a sheet of material passing along said fourth path, being thereafter maintained in its deflected position by the body of said sheet material, and being operative to return to its original position when released by passage of the trailing edge of said sheet past said movable element.

7. The combination of claim 6 wherein said sensor means comprises a microswitch, said movable element comprising an actuating arm for said microswitch.

8. The combination of claim 7 wherein said diverter gate is pivotally mounted and has a generally triangular shape in cross section, a first guide plate located adjacent to and spaced from a first side of said generally triangular gate to define said third path therebetween, the second and third sides of said gate extending respectively toward one another from opposing edges of said first side and intersecting one another at a position adjacent to but spaced from the nip of said rollers, a second guide plate disposed adjacent to and spaced from said second side of said gate to define said fourth path therebetween, and a third guide plate disposed adjacent to and spaced from the third side of said gate to define said fifth path therebetween.

9. The combination of claim 8 wherein at least two sides of said diverter gate and their cooperating spaced guide plates are of smoothly curved configuration of define curved paths therebetween.

* * * * *